UNITED STATES PATENT OFFICE.

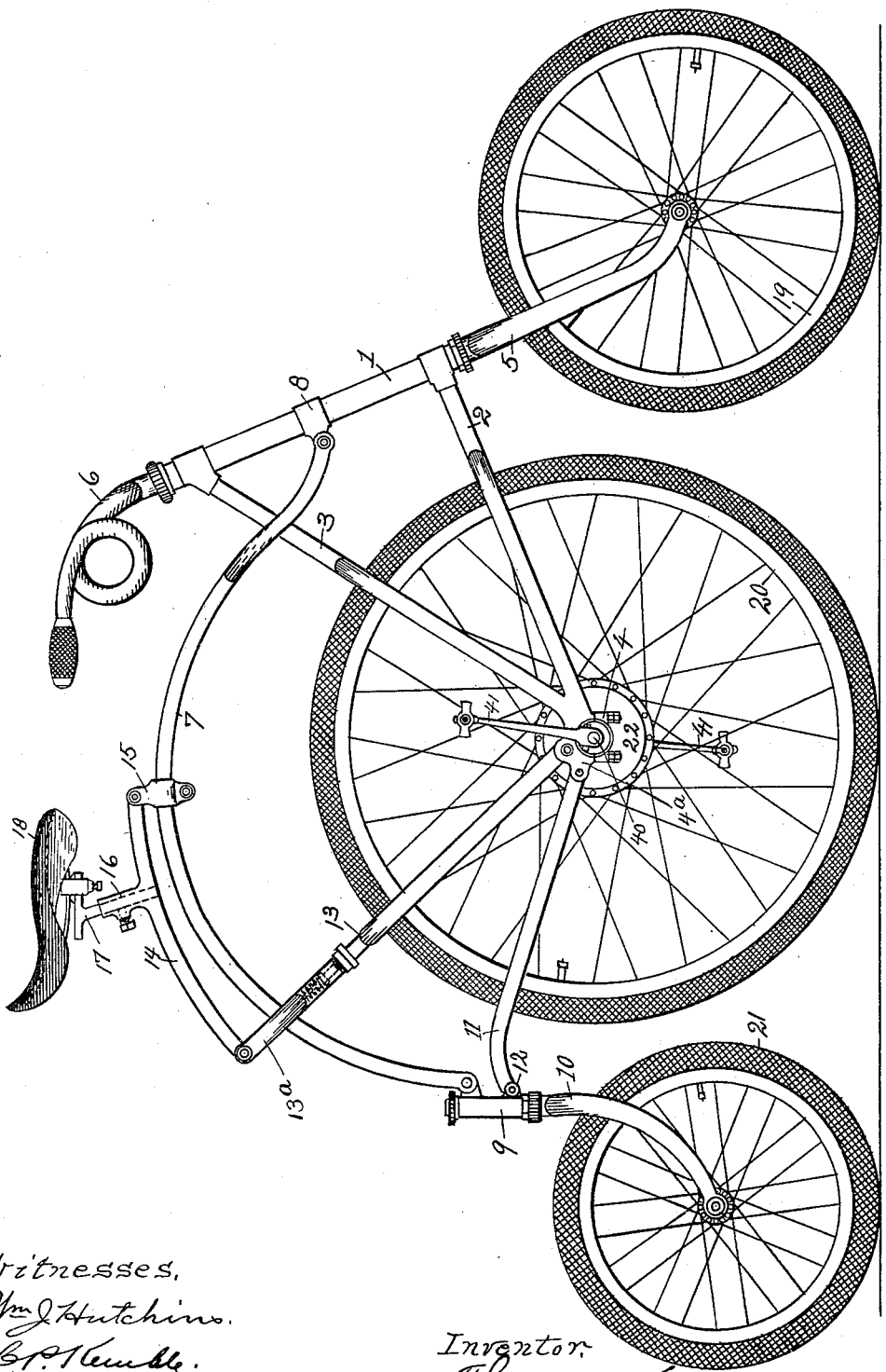

THOMAS J. COOKSON, OF JOLIET, ILLINOIS.

CYCLE.

SPECIFICATION forming part of Letters Patent No. 632,102, dated August 29, 1899.

Application filed December 20, 1897. Serial No. 662,533. (No model.)

*To all whom it may concern:*

Be it known that I, THOMAS J. COOKSON, a citizen of the United States, residing at Joliet, in the county of Will and State of Illinois, have invented a new and useful Improvement in Cycles, of which the following is a specification.

This invention relates to that class of cycles having three wheels arranged in line with each other and with the front and rear wheels swiveled to the frame, and more especially to the construction of the frame used with such wheels.

The main object of the invention is to adapt the frame to absorb the up and down movements or vibrations caused by unevenness in the road-surface, so as to relieve the rider of the unpleasant sensations due thereto.

The nature of the invention is fully set forth below and also illustrated in the accompanying drawing, in which I show a side elevation of a cycle embodying my invention.

In this invention I make only a portion of the frame rigid—viz., that part connecting the steering and drive wheels together, and composed of the front or steering-post tube 1, which is much like the ordinary steering-post tube, and two forked braces 2 and 3, connecting the top and bottom, respectively, of the tube with the boxes 4 of the center or drive wheel 20. These three parts form a rigid triangular frame, as will be seen from the drawings. The steering-post 5 passes through the tube and is equipped at the top with a handle-bar 6, either of the particular construction shown or of any other ordinary form of such devices, and at the bottom the post is forked to receive the steering-wheel 19. This forward rigid frame supports the front end of the curved tube 7, forming the spine or backbone of the machine, and the rear end of said spine is supported by the rear or trailer wheel 21. The spine is pivoted at its forward end to the clamp 8, which is adjustably secured upon the upright tube 1, and is also forked at that end, so it may not interfere with the brace 3, and at its rear end the spine is pivoted to the box 9, in which is swiveled the fork 10 of the rear wheel. The junction of the spine with the box 9 is at the upper part of the box and horizontal braces 11 extend from the lower part 12 of said box to the boxes 4 at the opposite sides of the drive-wheel, so that the said box 9 will be held upright and at a fixed distance from the drive-wheel; but the joints are such as to permit independent vertical movement of the trailer-wheel when passing over obstructions or through depressions in the road.

The saddle, which is shown at 18, is supported partly by the spine 7 and partly from the drive-wheel and is located back of the axis of the latter, so as to enable the rider to operate pedals attached to a shaft passing through the axis of the drive-wheel. A rearwardly and upwardly extending brace 13, forked so as to enable it to set down upon both sides of the drive-wheel, extends from and is flexibly joined to the boxes 4 of said wheel or to ears 4ª, supported upon the boxes, and is also joined to a Y-shaped piece 13ª, the limbs of which extend past the spine at opposite sides thereof and are there pivotally joined to a bar 14, lying substantially parallel to the spine and pivotally supported at its front end in a clip 15, secured upon the spine. This bar 14 is provided with an upwardly-extending neck 16, adapted to receive the seat-post 17, and a set-screw in the neck is adapted to allow the vertical adjustment of the post. A spring may be inserted in the Y-shaped piece 12, as indicated in broken lines, if it is desired to make said piece yield in the direction of its length.

The pedals 41, whereby the center or drive wheel is actuated, are attached to a shaft 40 passing through the axis of that wheel, and the hub 22 of the wheel is adapted to inclose any suitable gearing for carrying motion and power from the shaft to the wheel, and such gearing may be adapted to increase the speed of rotation of the wheel beyond that of the shaft.

The handle-bars 6 are constructed of tubing having one or more complete coils or turns embodied therein between the grips and their junction with the steering-post, such coils being adapted to yield and absorb the vibrations to which the bars are subject in traveling over rough roads.

From the construction shown it will be evident that while the ends of the spine must rise and fall with the up and down movements of the front and rear wheels, yet only a fraction of such movements will be transmitted to the saddle; also, that the up-and-down motion of the drive-wheel will be felt only in part at the saddle, as such wheel has no connection to the spine and only an indirect connection to the saddle. The weight is also distributed between the three wheels.

The clip 15 is adjustable upon the spine and can be moved backward or forward at the rider's pleasure to bring the saddle nearer over or carry it back from the axis of the drive-wheel, as desired, or to adjust the seat with reference to the handle-bars. The forward end of the spine being adjustable upon the tube 1 also facilitates the vertical adjustments of the saddle.

I claim—

1. A cycle wherein are combined a rigid front frame, a spine pivoted to said frame at its front end, a trailer-wheel supporting the rear end of said spine, and a saddle supported upon a bar pivoted at its front end to the spine and movably supported at its rear end from said frame, substantially as specified.

2. A cycle having a steering-wheel, a drive-wheel and a trailer-wheel all arranged in the same plane, a frame uniting the steering and drive wheels, a spine hinged to said frame and uniting the trailer-wheel thereto, and a saddle the support of which is movably sustained at one end by said spine and is also movably sustained at the other end by the drive-wheel, substantially as specified.

3. A cycle wherein are combined a front frame embracing a steering-post tube, a trailer-wheel, a spine pivoted to said tube at one end and supported by said wheel at the other end, a saddle, and a horizontal saddle-supporting bar pivoted to the spine at the front end and movably supported from the frame at the rear end, substantially as specified.

4. The combination of the saddle the steering-wheel, the drive-wheel and the trailer-wheel, with the spine pivotally supported at its ends from the steering and trailer wheels, the bar 14 carrying the saddle and pivotally joined at its forward end to the spine, and a rear brace pivotally supported from the bearings of the drive-wheel which is arranged between the steering and the trailer wheels, said brace being also pivotally joined to the rear end of said bar, substantially as specified.

5. The cycle having three wheels normally supporting the machine and all arranged in the same longitudinal plane with the drive-wheel between the steering and trailer wheels, a rigid frame connecting the steering and drive wheels together, a pivoted connection uniting the trailer to said rigid frame and a saddle supported by the bar 14 which is movably sustained in part from said pivoted connection, and in part from said rigid frame, substantially as specified.

6. In a cycle, the combination of the rigid frame arranged to connect with and carried by the drive and steering wheels; the spine pivotally supported at its forward end, by said frame, and at its rear end by the trailing-wheel, the saddle-bar pivotally connected at its forward end to said spine, and at its rear end to a support pivotally joined to said rigid frame, substantially as and for the purpose specified.

7. In a cycle, the drive-wheel having its bearings rigidly connected to the steering-post tube by means of forks; the spine pivotally and adjustably connected at its forward end to said post-tube, and supported at its rear end by the trailing-wheel; the saddle-bar pivotally and adjustably connected at its forward end to said spine and supported at its rear end by means of a pivoted upright brace, all combined and operating substantially as and for the purpose specified.

8. A cycle having three wheels arranged in the same longitudinal plane, a spine supported at its ends from the front and rear wheels, and a saddle adjustably joined at one of its ends to said spine, and suitably supported at its other end from the center wheel, substantially as specified.

9. A cycle having three wheels arranged in the same longitudinal plane, a spine adjustably and pivotally attached to the steering-post tube and supported by the rear wheel at its rear end, and a saddle-supporting bar mounted at one end on said spine and movably supported from the frame at the other end, substantially as specified.

THOMAS J. COOKSON.

In presence of—
WM. J. HUTCHINS,
J. P. KEMBLE.